Patented Mar. 25, 1952

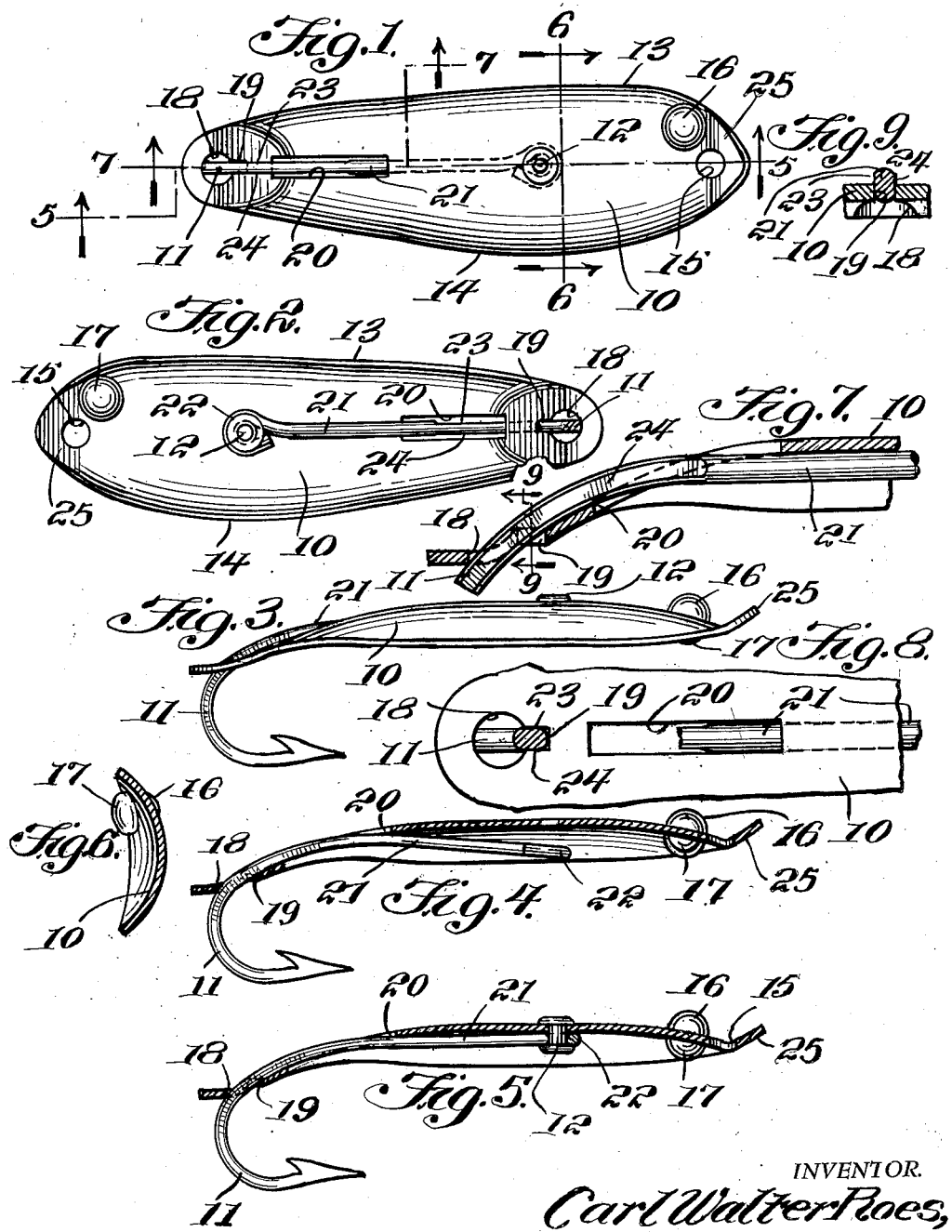

2,590,723

UNITED STATES PATENT OFFICE 2,590,723

FISHING SPOON HOOK MOUNTING

Carl W. Roes, Pikesville, Md.

Application July 1, 1949, Serial No. 102,589

1 Claim. (Cl. 43—42.52)

This invention relates to spoons used as lures in fishing and particularly spoons with hooks mounted thereon, and in particular the invention relates to a spoon having a hook riveted to one face thereof and extended through openings therein and in which a key-hole slot is provided in the body of the spoon that coacts with flat surfaces on the sides of a hook to prevent oscillation or lateral movement of the hook.

The purpose of this invention is to provide means for mounting a fish hook on a fishing spoon in which the hook is rigidly held in a fixed position.

Various methods have been provided for mounting hooks on fishing spoons but it has been found difficult to retain the hook in a plane perpendicular to the spoon and when the hook moves over toward either edge of the spoon it is difficult to retain fish thereon. With this thought in mind this invention contemplates a fishing spoon having hook receiving openings therethrough with a notch in one of the openings forming a key-hole slot for holding the hook in a plane perpendicular to the plane of the spoon.

The object of the invention is, therefore, to provide means for constructing a fishing spoon wherein a hook mounted on the spoon is held with tension therein and with the shank of the hook positioned in a notch in an opening through the spoon whereby the hook will be held in a position extended outwardly from the face of the spoon.

Another object of the invention is to provide a fishing spoon having a hook rigidly mounted thereon in which the spoon is shaped to oscillate or wobble as it is drawn through the water.

A further object of the invention is to provide an improved fishing spoon having a hook in combination therewith wherein the hook is riveted to the spoon and extends through openings therein and in which the lure is of a simple and economical construction.

With these and other objects and advantages in view the invention embodies a concave-convex fishing spoon, arcuate in cross section with the edges conforming to corresponding surfaces of a fish and with a hook riveted to the intermediate part of the spoon and extended through openings therein.

Other features and advantages of the invention will appear from the following description taken in connection with the drawings wherein:

Figure 1 is an elevational view looking toward the outer or convex side of the spoon.

Figure 2 is a similar view looking toward the concave inner or opposite side of the spoon and with part of the hook broken away.

Figure 3 is an elevational view looking toward one edge of the spoon.

Figure 4 is a similar view showing a longitudinal section through the spoon with a fish hook extended through openings therein and with the hook in the free position wherein the eye thereof is spaced from the face of the spoon.

Figure 5 is a similar view showing the eye of the hook drawn against the back of the spoon by an eyelet or rivet producing tension in the shank of the hook, and taken on line 5—5 of Figure 1.

Figure 6 is a cross section through the spoon taken on line 6—6 of Figure 1.

Figure 7 is a detail showing a section taken on line 7—7 of Figure 1 illustrating the shank of the hook extended through openings in the spoon and with parts of the spoon and hook broken away.

Figure 8 is an elevational view with parts broken away and parts shown in section illustrating the parts of the hook and spoon shown in Figure 7.

Figure 9 is a detail showing a cross section taken on line 9—9 of Figure 7 through the end of the spoon showing the slot in the spoon through which the shank of the hook passes.

Referring now to the drawings wherein like reference characters denote corresponding parts the improved fish hook mounting on fishing spoon of this invention includes a concavo-convex body 10, a hook 11, and an eyelet or rivet 12.

In the design shown the body of the spoon 10 is formed with a concavo-convex plate, as shown in Figure 6 and one edge 13 conforms substantially to the back of a fish with the other surface 14 shaped to correspond with the belly or under surface of the fish. The forward or leading end of the spoon is provided with an opening 15 to which a fishing line may be attached and above the opening 15 are knobs 16 and 17 that extend outwardly from the surfaces of the spoon representing eyes.

An eye 18 with a notch 19 in the inner edge thereof forming a key-hole slot is positioned in the opposite end of the spoon and spaced from the eye 18 is an elongated slot 20 through which the shank 21 of the hook extends, particularly as illustrated in Figure 2.

With the shank of the hook positioned through the eye 18 and slot 20 as illustrated in Figure 4 the inner end of the shank on which the eye 22 is positioned extends outwardly away from the back of the spoon and when the rivet 12 is riveted into position, as illustrated in Figure 5, the rivet pulls the shank against the inner face of the spoon placing tension in the shank of the hook whereby the outer portion of the shank of the hook is urged outwardly and into the notch 19 in the inner edge of the eye 18. With the hook held in tension, in this manner, flat surfaces 23 and 24 on the sides of the shank of the hook are permanently secured in the socket 19 in the side of the key-hole slot or eye 18, as illustrated in Figure 8 and the hook will be rigidly held whereby movement thereof in relation to the spoon is prevented. The spoon may be drawn through the water by a fishing line so that it will oscillate, wobble, or travel with a wavy motion and the hook will remain in fixed relation to the spoon with the point extended outwardly in a plane substantially perpendicular to the plane of the spoon.

The leading end of the spoon is provided with an angularly positioned lip 25 and, as illustrated in Figures 1 and 2, the width of the leading part of the body is greater than that of the trailing part.

With the hook mounted in the spoon with the shank extended through the openings of the spoon it would be impossible for the hook to work out of the spoon even though the rivet should work loose, pull out, or become disengaged.

It will be understood that modifications may be made in the design and arrangement of the parts without departing from the spirit of the invention.

What is claimed is:

A fish lure comprising an elongated concavo-convex plate in which the width of the leading end is greater than that of the trailing end, said plate having an angularly disposed lip on the leading end, and said leading end having a line receiving opening therethrough, said plate also having spaced openings through the trailing end and said spaced openings and line receiving opening being positioned on the longitudinal center of the plate, a hook having a shank with an eye on one end thereof, said shank extending through the spaced openings in the trailing end of the plate and the said eye being positioned in a plane perpendicular to the plane of the bight of said hook, the one of the said spaced openings in the trailing end of the spoon having a key-hole shape and the other of the said spaced openings being elongated and of rectangular shape, said spaced openings being so positioned that when the shank of the hook is inserted through said openings the eye on the end of the shank is held in spaced relation to the face of the plate, and a rivet through the eye of the shank of the hook and also through the plate acts to force the eye of the shank against said face and to place the shank of the hook under tension.

CARL W. ROES.

REFERENCES CITED

The following references are of record in the file of this patent:

UNITED STATES PATENTS

| Number | Name | Date |
|---|---|---|
| 806,038 | Hipp | Nov. 13, 1906 |
| 1,314,052 | Dubrow | Aug. 26, 1919 |
| 1,754,073 | Yates | Apr. 8, 1930 |
| 1,763,031 | Yates | June 10, 1930 |
| 1,774,976 | Huntington | Sept. 2, 1930 |
| 1,910,742 | Binns | May 23, 1933 |
| 2,214,409 | Eaby | Sept. 10, 1940 |
| 2,319,686 | Janisch | May 18, 1943 |
| 2,385,274 | Hammond | Sept. 18, 1945 |